United States Patent
Khavari

[11] Patent Number: 6,021,977
[45] Date of Patent: Feb. 8, 2000

[54] VERTICAL STABILIZER FIN ASSEMBLY FOR AN AIRCRAFT

[75] Inventor: Kourosh Khavari, Huntington Beach, Calif.

[73] Assignee: McDonnell Douglas Corporation, St. Louis County, Mo.

[21] Appl. No.: 08/884,335

[22] Filed: Jun. 27, 1997

[51] Int. Cl.[7] .................................................. B64C 9/00
[52] U.S. Cl. ............................................. 244/87; 244/91
[58] Field of Search ................................ 244/87, 91, 217

[56] References Cited

U.S. PATENT DOCUMENTS

| | | | |
|---|---|---|---|
| 2,045,638 | 6/1936 | Dormoy | 244/29 |
| 2,410,855 | 11/1946 | Koppen | 244/42 |
| 2,480,040 | 8/1949 | Mitchell | 244/87 |
| 2,945,651 | 7/1960 | Jensen et al. | 244/90 |
| 3,618,878 | 11/1971 | Kein et al. | 244/77 |
| 5,458,304 | 10/1995 | Gilbert | 244/90 |
| 5,564,656 | 10/1996 | Gilbert | 244/217 |

*Primary Examiner*—J. Woodrow Eldred
*Attorney, Agent, or Firm*—Brooks & Kushman P.C

[57] ABSTRACT

A vertical stabilizer fin and rudder assembly for use on an aircraft including a stabilizer fin with airfoil surfaces and a rudder with a forward margin pivotally mounted on the trailing edge of the stabilizer fin. The assembly is subjected to Bernoulli forces as a relatively moving airstream passes over it in a chordal direction. A fin spoiler is pivotally mounted on each fin surface at a forward chordal location on the assembly whereby the effective sideslip capability for the fin surfaces, when the aircraft is operated in a crosswind, is substantially increased.

8 Claims, 8 Drawing Sheets

VERTICAL STABILIZER FIN ASSEMBLY FOR AN AIRCRAFT

STATEMENT OF GOVERNMENT INTEREST

This invention was made with the support of the Government of the United States under Contract No. F 33657-81-C-2108. The U.S. Government has certain rights in this invention.

TECHNICAL FIELD

The invention relates to management of Bernoulli forces acting on an aircraft vertical stabilizer fin to complement yaw control by a rudder at the trailing edge of the stabilizer.

BACKGROUND ART

In flight control of an aircraft, it is normal practice to compensate for crosswinds that affect the aircraft during landing maneuvers by using a rudder to oppose the weathercocking effect of the vertical stabilizer fin. Crosswinds will cause the aircraft to point away from the direction of the runway. The aircraft thus approaches the runway sideways, which is known in the industry as crabbing. The operator of the aircraft attempts to maintain a flight course that corresponds to the aircraft heading and to reduce crabbing of the aircraft, especially during low airspeed landings when reduced wind correction angles are desirable.

The management of aerodynamic forces on an aircraft during landing maneuvers with crosswinds at the runway in excess of the aircraft's usual directional control capabilities can be improved by increasing the landing speed. This has many disadvantages, however, including the disadvantage of requiring relatively long runways for bringing the aircraft to a stop once it has touched down.

During crosswind landing maneuvers of a typical aircraft, the rudder is used to decrab the aircraft to the runway heading. The use of the aircraft rudder to completely decrab the airplane to the runway heading has not heretofore been feasible in a 30 knot crosswind landing with conventional rudder travel of about 22°/22°. It is possible to achieve a steady state sideslip capability of about $\beta=14.5°$ $$\left(\sine\beta = \frac{\text{crosswind speed}}{\text{resultant airspeed}}\right)$$

during landings with low crosswind speeds, but usually it is not possible to achieve the need full rudder steady state sideslip capability in a 30 knot crosswind. Designing the aircraft for increased rudder travel does not result in increased steady sideslip angle capability as the aircraft pilot attempts to completely decrab the airplane prior to touchdown.

DISCLOSURE OF THE INVENTION

The invention comprises a stabilizer fin and rudder assembly for an aircraft including a stabilizer fin with airfoil surfaces. A rudder. is pivotally mounted on the trailing edge of th e stabilizer fin. Bernoulli forces are created as a relatively moving airstream passes over the assembly.

Fin spoilers are pivotally mounted near the forward margin of the stabilizer fin on each side of the fin surfaces. The chord of the fin spoiler is substantially less than the chord of the stabilizer fin and rudder assembly. During operation of the aircraft in a crosswind, the downwind spoiler is deployed to increase the effective sideslip capability for the stabilizer fin surface.

The fin spoiler of the invention is strategically located with respect to the aerodynamic surfaces of a vertical fin stabilizer. As mentioned above, it is located relatively close to the leading edge of the stabilizer airfoil surfaces, preferably less than 20% of the chord of the vertical stabilizer fin and rudder assembly. The vertical fin spoiler chord may be less than 10% (preferably about 5%) of the chord of the vertical stabilizer fin and rudder assembly, and may extend over the lower half of the fin span. The fin spoiler has a control surface that is movable between active and inactive positions to weaken the weathercock effect generated by the fin, thereby complementing the force generated by the rudder and improving directional control.

The vertical fin spoiler of the invention counteracts the aerodynamic forces established by the vertical fin stabilizer during crosswind, low airspeed maneuvers which tend to cause the aircraft to yaw in the direction of the wind. The invention improves the ability of an aircraft to make crosswind landings for any given airspeed of the aircraft.

Each side of the vertical fin stabilizer is provided with the fin spoiler of the invention. The fin spoilers may be actuated selectively depending upon the direction of the crosswind. The fin spoilers weaken the Bernoulli forces acting on one side or the other of the vertical fin stabilizer depending upon crosswind direction thereby making the force generated by the rudder more effective in maintaining directional control of the aircraft. This increases the ability of the aircraft operator to maintain directional control without exceeding normal rudder displacements.

It is known in the art to use spoilers for purposes of interrupting normal air flow over an airfoil surface. This is done, for example, to decrease the so-called lift drag caused by the aerodynamic forces, but such spoilers are not designed to increase slide slip angles of an aircraft as the operator of the aircraft attempts to decrab the aircraft, particularly at low speeds. An example of a spoiler used for the purposes of reducing lift drag may be seen by referring to U.S. Pat. No. 4,583,304.

While an embodiment of this invention is disclosed, the disclosure should not be construed to limit the claims. It is anticipated that various modifications and alternative designs may be made without departing from the scope of the invention.

BEST MODE FOR CARRYING OUT THE INVENTION

Figure 1:
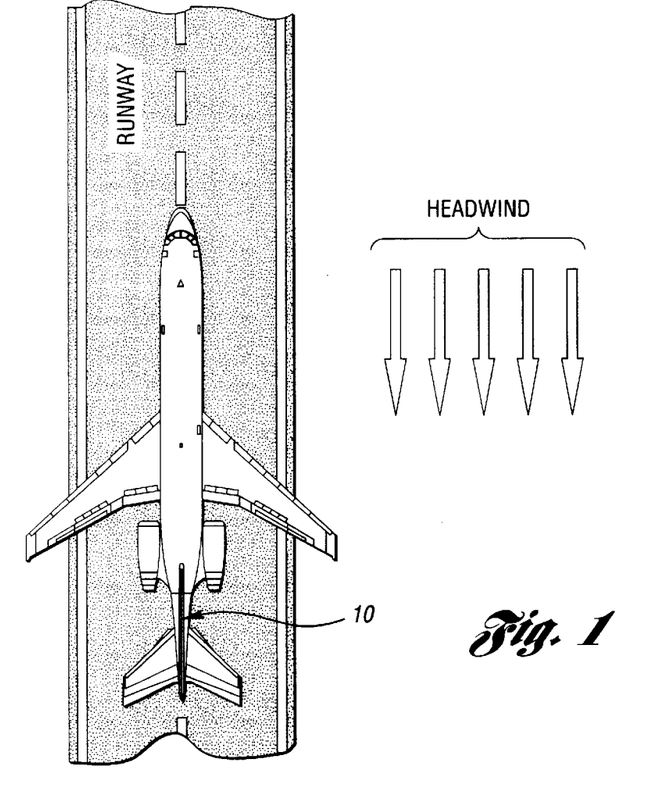
FIG. 1 shows in schematic form an aircraft approaching a runway in a headwind that is parallel to the direction of the runway.

Shown in FIG. 1 is a schematic illustration of an aircraft approaching a runway during a landing maneuver. A headwind parallel to the runway is represented by directional vectors. A crosswind develops forces on the aircraft, as indicated in the schematic representation of FIG. 2. Any crosswind blowing in a direction other than the direction parallel to the runway on which the aircraft is landing will develop a force component "a" in the direction perpendicular to the runway which tends to force the aircraft away from the runway.

The vertical stabilizer fin 10 on the aircraft provides positive directional stability with zero sideslip, which generally is a desirable feature during cruising. During a crosswind landing maneuver, however, that directional stability during decrabbing actually tends to force the heading of the aircraft away from the runway because of the fact that the vertical fin 10 "weathercocks" the aircraft in the direction of the wind. In order to counteract the "weathercocking force" tending to push the aircraft away from the runway, an aircraft conventionally uses a rudder 18, as illustrated in FIG. 2, which creates a force opposite to the force on the vertical stabilizer fin created by the crosswind.

Figure 2:
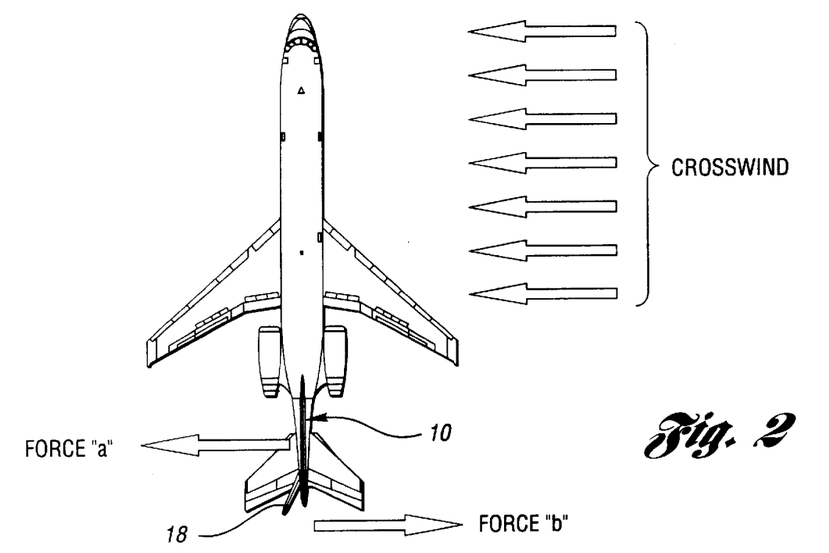
FIG. 2 is a schematic representation of the forces acting on the vertical fin stabilizer and on the rudder when the aircraft is operating in a 90° cross-wind.

In FIG. 2, force "b" is a directional control force due to the rudder 18. Force "a", as mentioned above, is a directional control force due to the vertical stabilizer. For steady state flight, force "b" must negate force "a".

The fin spoiler of the present invention will reduce force "a", thereby allowing the rudder to be relatively more effective in the management of forces due to a high velocity crosswind.

Figure 3A:
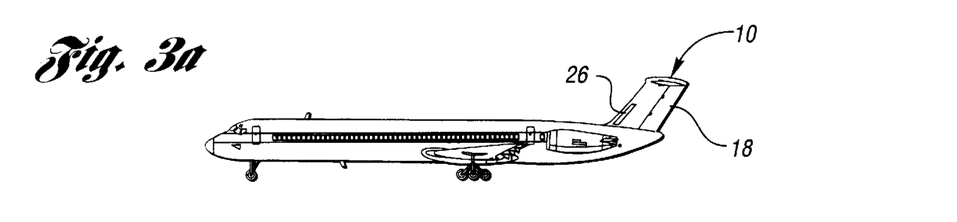
FIG. 3a is a schematic representation of an aircraft with a fin spoiler used to complement the action of a rudder in accordance with the teachings of the invention.

FIG. 3a is a schematic side elevation view of an aircraft such as that shown in FIGS. 1 and 2. A fin spoiler 26, identified in FIG. 3a, is located relatively close to the leading edge of the vertical fin stabilizer 10. A rudder 18 is situated at the trailing edge of the vertical fin stabilizer in conventional fashion.

A fin spoiler 26 is located on each side of the vertical fin stabilizer 10. Each spoiler 26 is an extendable plate which can be activated either manually or by a powered actuator. The fin spoiler 26 on the downwind side of the vertical fin stabilizer would be extended and the fin spoiler 26 on the windward side of the vertical fin stabilizer 10 would be retracted into the surface of the stabilizer 10.

Figures 3B, 3C:
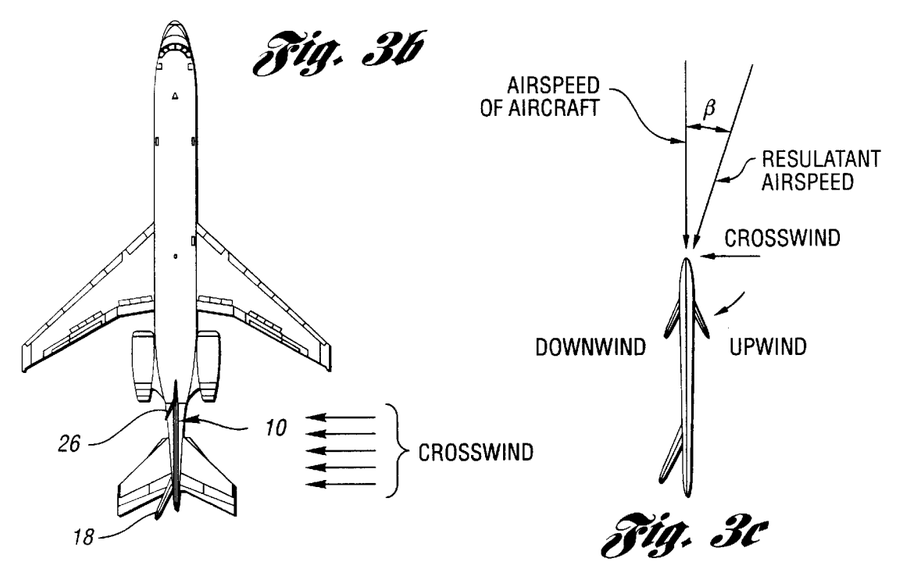
FIG. 3b is a plan view of the aircraft of FIG. 3a showing the fin spoiler deployed to an extended, active position.
FIG. 3c is a schematic view of an aircraft vertical stabilizer and rudder assembly in which both upwind and downwind spoilers are deployed during the beginning of the approach phase of a crosswind landing maneuver.

As seen in FIG. 3c, both spoilers may be deployed if increased drag is desired during the beginning of an approach to a runway in a crosswind landing maneuver. The spoiler on the upwind side would be retracted as the downwind spoiler is deployed, as shown in FIG. 3b, in a later phase of the approach. The two spoilers may be actuated in synchronism by a central controller.

The downwind fin spoiler 26 is most effective during operation of the aircraft at low airspeeds, such as the speeds associated with approach and landing maneuvers, although it has other uses in other phases of flight such as take-off, climb-out, cruise, etc. if improvement in directional control is required during high velocity flight conditions.

Figure 8:
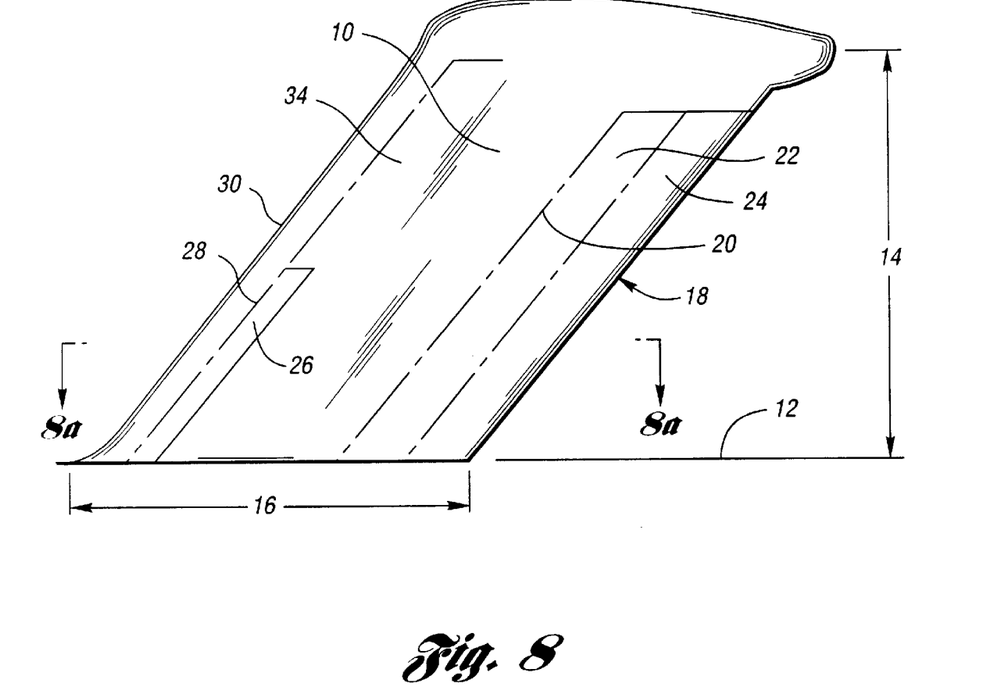
FIG. 8 is a side elevation view showing the geometry of a vertical fin stabilizer, a rudder, and a spoiler of the present invention.

FIG. 8 shows an embodiment of the invention applied to a vertical fin stabilizer 10 having a rearward sweep relative to a horizontal baseline 12. The vertical stabilizer fin span dimension is identified at 14 and the vertical stabilizer fin chord at the base or root of the vertical fin stabilizer is shown at 16.

A directional control rudder 18 is located at the trailing edge of the vertical stabilizer fin 10 and is hinged at 20. It typically can be moved approximately 22° either side of center. In the particular embodiment shown in FIG. 8, the rudder 18 is comprised of two sections, as seen at 22 and 24, the latter being hinged on the trailing edge of the former, thereby making it possible to provide more sensitive directional control if that is desired. The invention does not require, however, an articulated rudder assembly of the kind shown in FIG. 8. It may be used, for example, with a vertical stabilizer having a unitary rudder.

A spoiler, shown at 26, is located at approximately 10% of the chord 16 as measured from the leading edge of the vertical stabilizer fin 10. The spoiler 26 comprises a plate preferably hinged at 28 on an axis parallel to the leading edge 30 of the vertical tail.

Figure 8A:
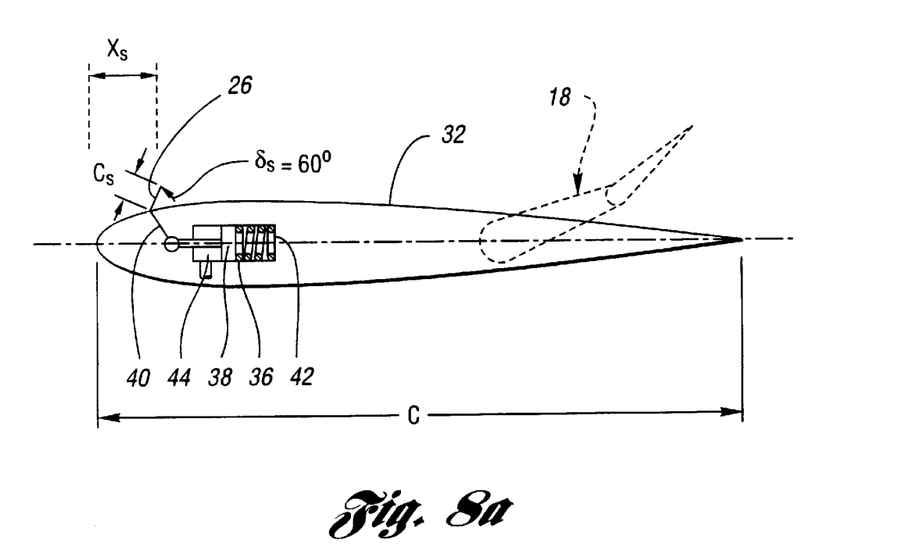
FIG. 8a is a sectional view taken along the plane of section line 8a—8a of FIG. 8.

In the cross-sectional view of FIG. 8a, the spoiler 26 is shown in the extended or active position. The chord of the spoiler, identified by the symbol $C_S$, may be approximately 5% of the chord C represented in FIG. 8a, which is the chord taken at the section line 8a—8a of FIG. 8. Illustrated schematically in FIG. 8a is an actuator for moving the spoiler to its extended position and for retracting the spoiler so that it coincides with the air foil surface 32 of the vertical fin stabilizer portion 34 of the vertical tail 10. Although various types of actuators may be used, a hydraulic actuator has been illustrated in schematic form in FIG. 8a. It comprises a hydraulic cylinder 36 and a cooperating hydraulic piston 38. Piston 38 is connected by a mechanical linkage 40 to the spoiler 26. When the piston 38 is moved to the left, as seen in FIG. 8a, the spoiler 26 is retracted. When the piston is moved in the right direction, the spoiler is deployed to the position shown in FIG. 8a.

A spring 42 may be used to normally urge the spoiler to its retracted position. Fluid pressure may be admitted to pressure chamber 44 of the hydraulic actuator to overcome the force of the spring 42 and to shift the piston 38 to the spoiler extended position. Because such hydraulic actuators are well known in the art, they will not be described in further detail here.

As previously mentioned, and as illustrated in FIG. 8a, the spoiler may be located a distance $X_s$, which is approximately 10% of the chord of the vertical stabilizer fin.

As previously explained, the pilot of the aircraft, when landing in a crosswind, must decrab the airplane using the rudder, but the rudder control must not be saturated. That is, runway heading must be obtained prior to touchdown with a rudder angle at least 3° from the rudder stop during crosswind landing maneuvers. In the case of a lightweight landing in a 30 knot crosswind, this normally would require a full-rudder steady slide slip capability of approximately 18°. A rudder travel of 22°/22° should increase the full rudder steady state sideslip capacity to about 14.5°. Beyond that point, increased rudder angle becomes progressively less effective in producing increased steady sideslip angle. Full steady slide slip capability of 18° can be achieved with full rudder, however, by using the vertical fin spoiler of the invention.

By employing the spoiler of the invention, the effectiveness of the vertical fin directional control reduces the plane's normal weathercocking tendency in strong crosswinds.

Figure 4:
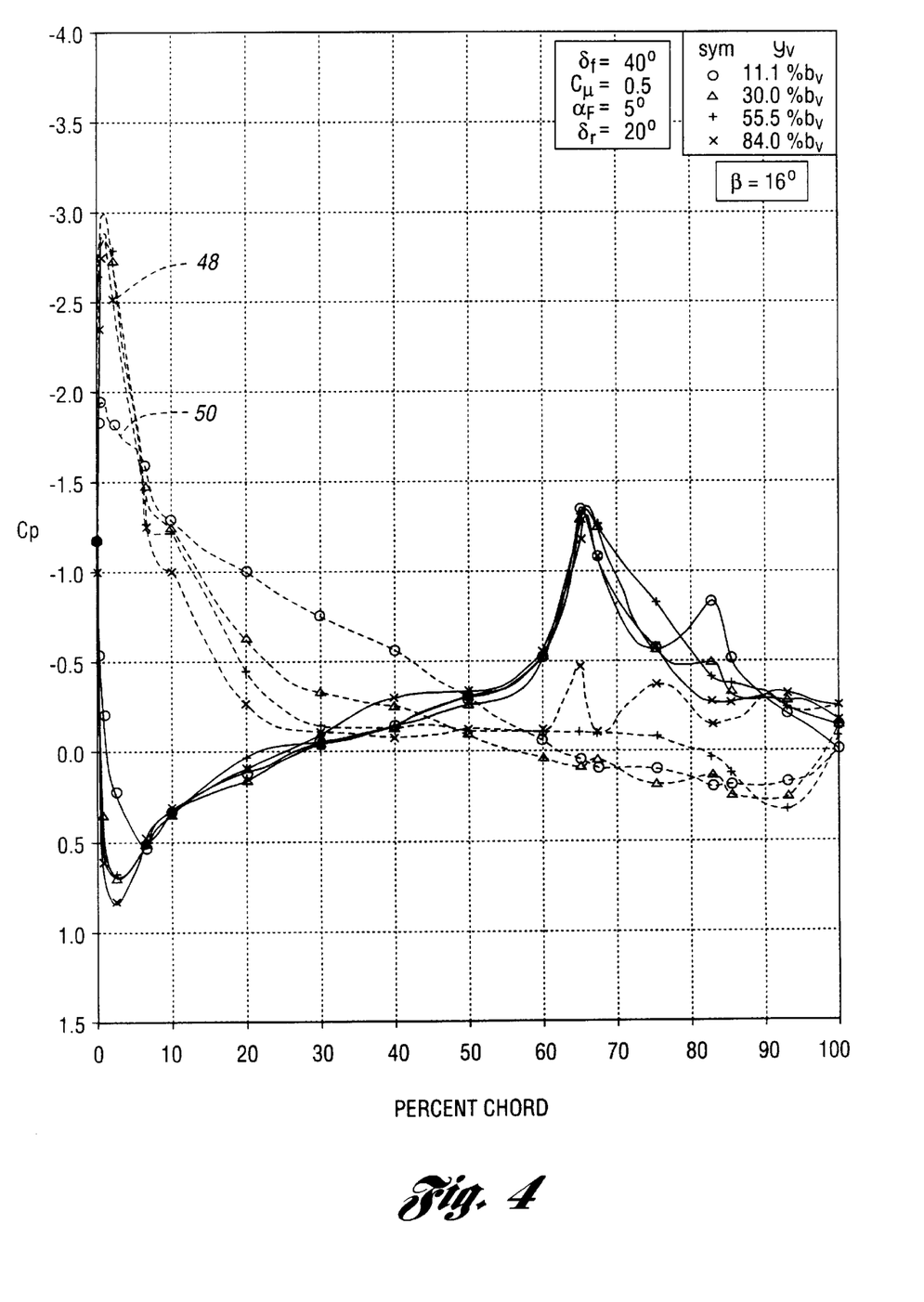
FIG. 4 is a plot of the pressure coefficient acting on a vertical fin stabilizer versus the percent chord of the stabilizer for a sideslip angle of 16°.

Chordwise distributions of pressure coefficients over each side of the fin and rudder are plotted in FIG. 4 for a case where the rudder angle is 20°, the sideslip angle is 16°, the wing flap angle is 40°, the thrust coefficient $C_\mu$ is 0.5 and $\alpha_F$ equals 5°. The angle $\alpha_F$ is the fuselage angle with respect to air. These variables are representative of a landing condition.

In FIG. 4, the left side pressures on the downwind side of the vertical stabilizer are shown in dotted lines and the right side pressures, which are the pressures on the upwind side, are shown in solid lines. A separate plot is made for each pressure measurement location along the span. The plot identified by reference numeral 48 shows the pressure coefficient near the tip of the vertical stabilizer fin. Numeral 50 designates the plot for the pressure coefficient near the base of the vertical stabilizer.

Four sets of data are shown for fin spanwise locations of 11.1% to 84%. As seen in FIG. 4, the pressure force corresponding to coefficients forward of the 40% to 50% chord location tend to weathercock the plane and that the pressure force distribution from the midpoint location to the trailing edge location oppose the weathercock pressure forces.

Figure 5:
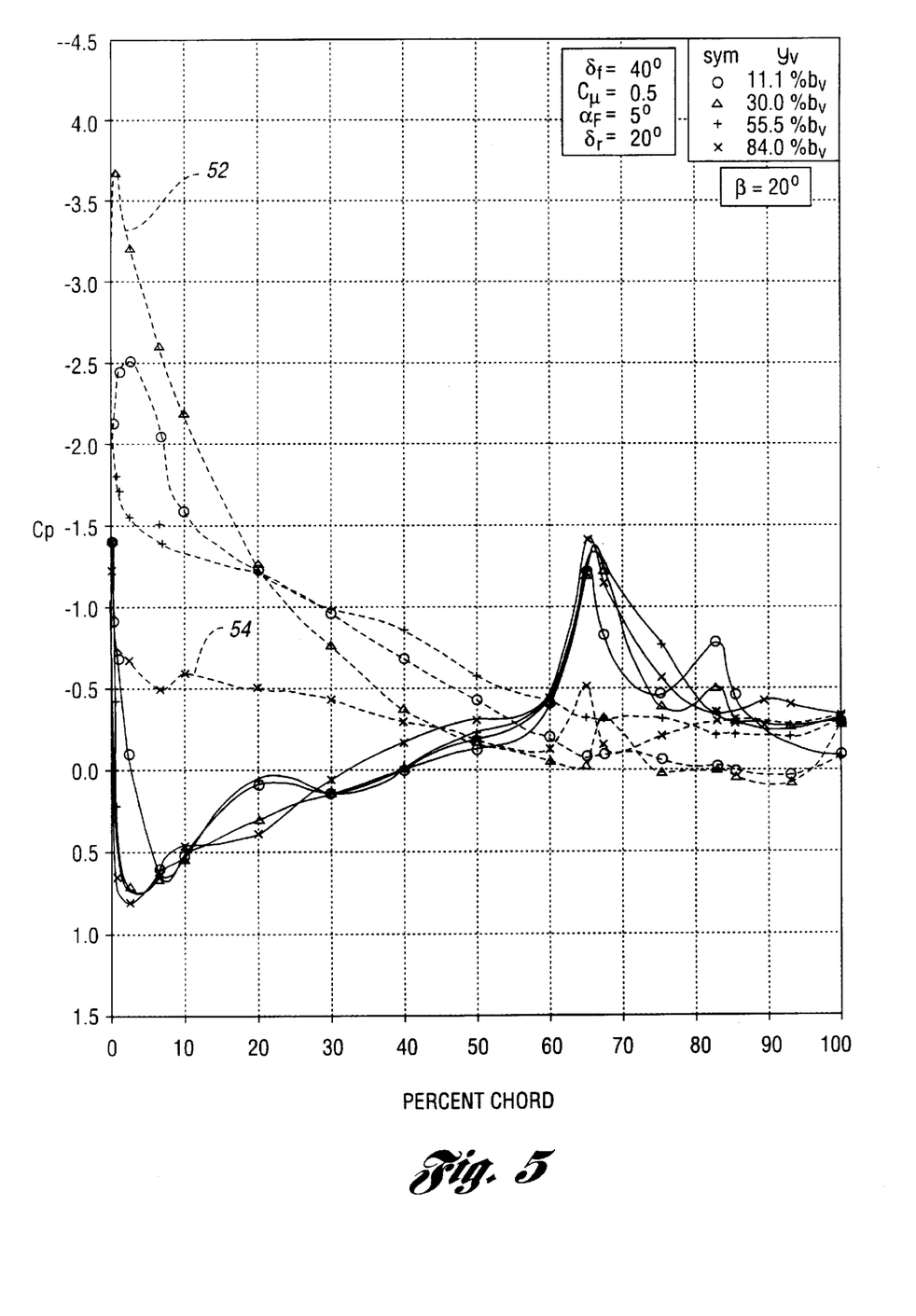
FIG. 5 is a plot similar to the plot of FIG. 4, although the sideslip angle is 20° rather than 16°.

FIG. 5 is a plot similar to FIG. 4, although the sideslip angle for the plot of FIG. 5 is 20° rather than 16°, as in the case of FIG. 4. Sideslip angle, for purposes of this discussion, is considered the angle of the air relative to the fin.

FIG. 5 indicates that the integrated pressures ahead of the 50% to 60% chord location exceed the corresponding pressures aft of that location. As in the case of FIG. 4, FIG. 5 indicates that the fin weathercocking tendency, which tends to yaw the nose of the plane to the right, far exceeds the rudder side force which tends to yaw the nose of the plane to the left. Under these conditions, the rudder deflection of 20°/20° cannot overcome the vertical fin weathercocking tendency.

In FIG. 5, numeral 52 indicates that the downwind negative pressure coefficients are a maximum at the root of the fin. They are lower at the tip as shown at 54.

Figure 6:
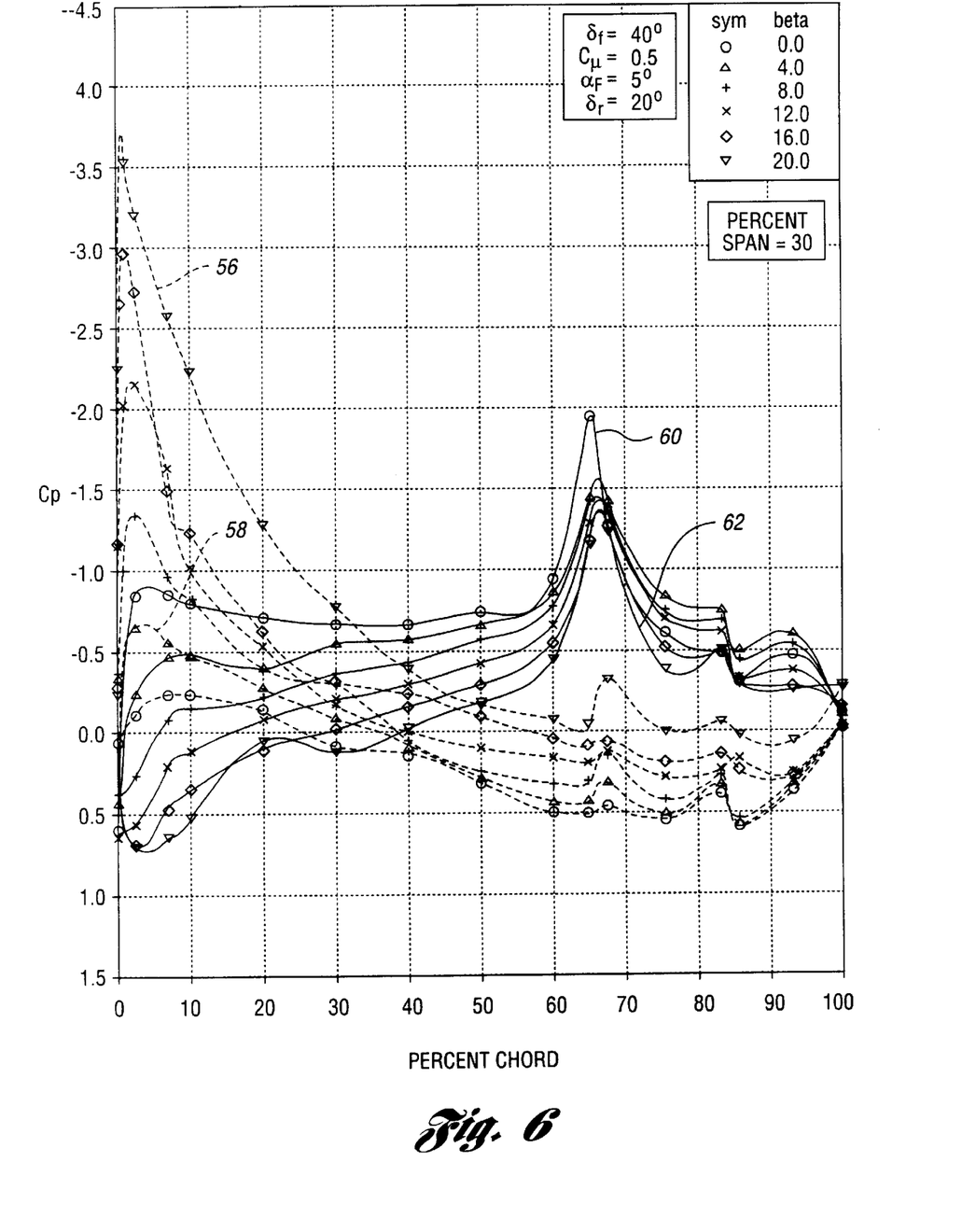
FIG. 6 is a plot of the pressure coefficient versus the percent chord for various sideslip angles at 30% span.

FIG. 6 shows the effect of varying sideslip angles from 0 to 20°, assuming the same thrust coefficient, fuselage angle, rudder angle and wing flap angle ($\delta_f$=40°).

Chordwise pressure distributions are plotted in FIG. 6 for a spanwise location of 30% span. The rudder deflection that is assumed for the plot of FIG. 6 is 20°/20°. It is seen in FIG. 6 that at low values of sideslip angle, the aft integrated pressures exceed the forward integrated pressures. Thus, the sideslip force due to a rudder deflection of 20°/20° exceeds the fin's weathercocking force. The reverse is true at high sideslip angles.

In FIG. 6, the upwind pressure coefficient for a sideslip angle of 20° is shown at 56. The corresponding pressure coefficient for a sideslip angle of 4° is shown at 58. On the other hand, at aft locations beyond the 50–60% chord values, the coefficient of pressure for low sideslip angles (e.g., 0°) is high as seen at 60, whereas a corresponding coefficient of pressure for a sideslip angle of 20° is lower as shown at 62.

Figure 7:
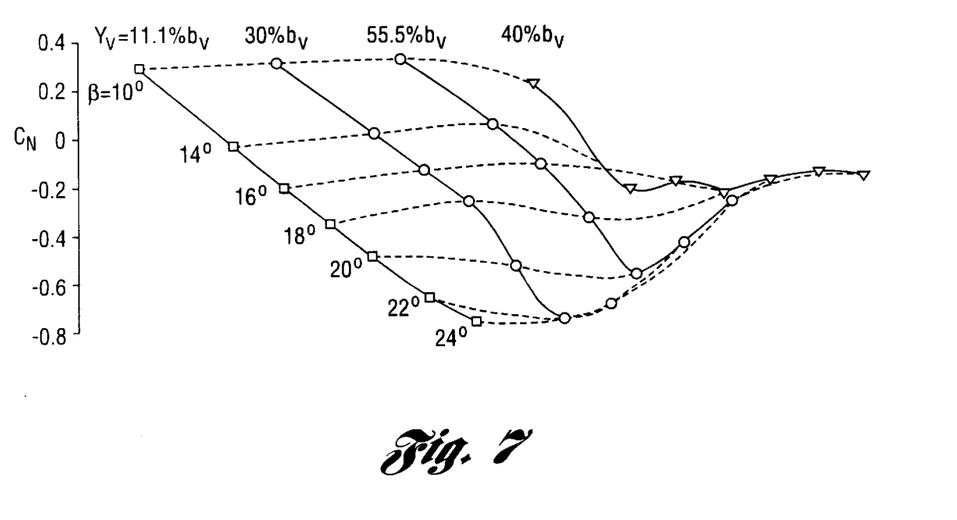
FIG. 7 is a plot of the normal force coefficient acting on a vertical tail section for each of several spanwise stations on the vertical fin for a 20° rudder; this coefficient is measured over a range of sideslip angles varying from 10° to 24°.

Using the data indicated in FIGS. 4, 5 and 6, the resultant vertical fin and rudder side force per unit span is plotted, as shown in FIG. 7 over a range of sideslip angles for each spanwise station at which pressure data is taken. The resulting vertical stabilizer fin section normal force coefficients ($C_N$), which are plotted on the ordinate, are obtained. It is seen that, at high sideslip angles (i.e., greater than 14°) and with the rudder deflected to the 20°/20° position, the normal force coefficient becomes negative. This indicates that the weathercocking tendency of the vertical fin section exceeds the directional control ability of the rudder at full deflection, assuming that full deflection is 20°/20°.

In order to increase the sideslip angle at which the phenomena of FIG. 4 occurs—that is, to increase the sideslip angles that can be produced by a rudder travel of 20°/20°—it would be necessary to reduce the area under the plot of pressure coefficient versus percent chord, indicated in FIGS. 4, 5 and 6, over the forward chordwise locations of the fin without significantly reducing the area over the aft chordwise locations.

A spoiler located on the downwind side of the vertical fin has this effect. It accomplishes this by spoiling the suction over that part of the fin surface without significantly influencing the positive pressures under the deflected rudder surface. This allows the fin to experience higher sideslip angles before a zero value of normal force component is experienced with the rudder fully deflected.

Figure 7A:
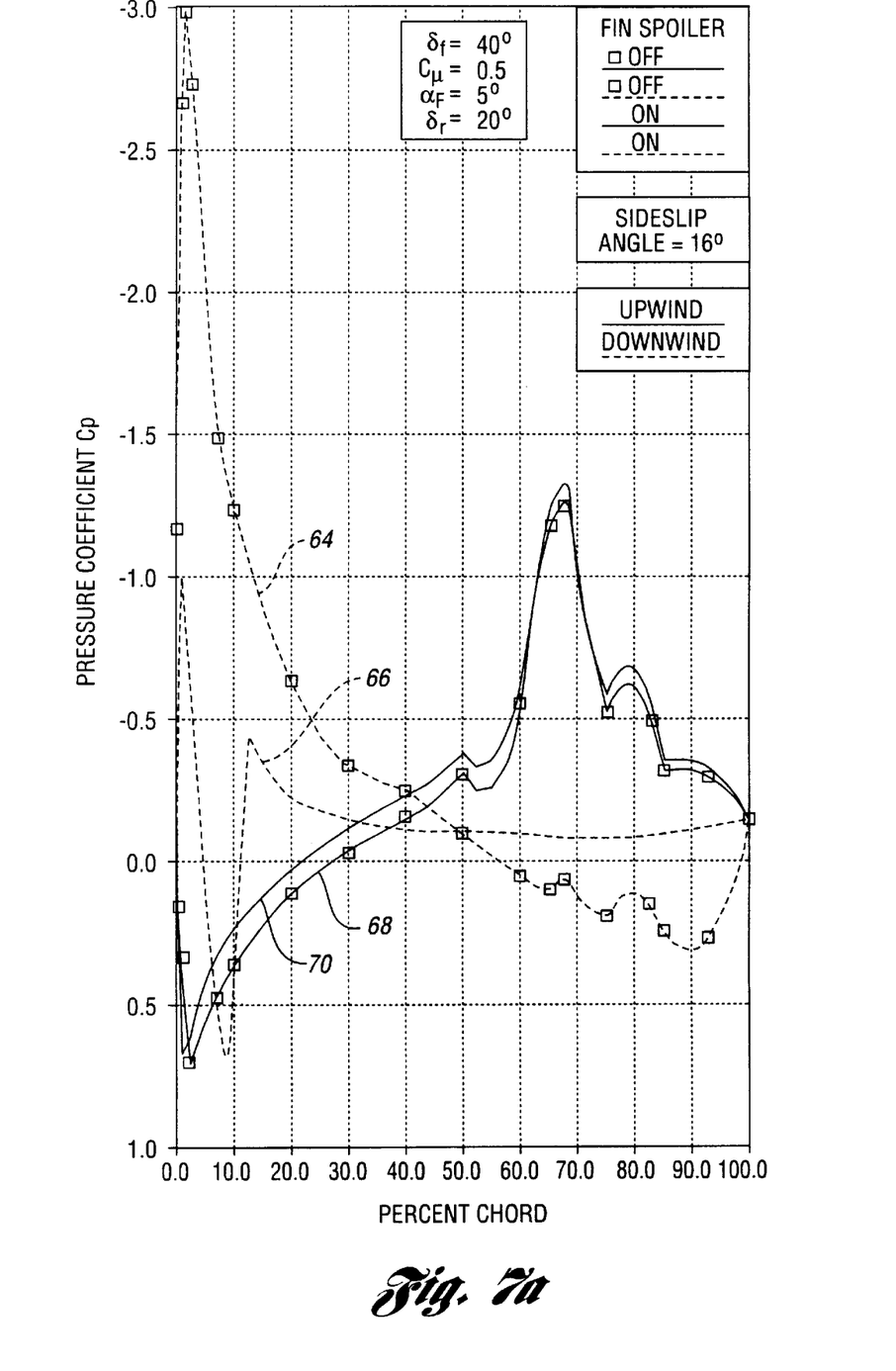
FIG. 7a is a plot of the pressure coefficient at 30% span versus the percent chord for a vertical fin stabilizer that includes the spoiler of the present invention and, for purposes of comparison, the corresponding plot for the same vertical fin stabilizer without the spoiler.

FIG. 7a shows a pressure distribution for a 30% spanwise location with a flap angle of 40°, a sideslip angle of 16°, a rudder angle of 20°, a fuselage angle of 5°, and a thrust coefficient of 0.5. The pressure distributions measured with no spoiler are shown together with the effect of spoiler deflection. On the downwind side, the coefficient of pressure with no spoiler is shown at 64 and the corresponding pressure coefficient on the downwind side with the spoiler in place is shown at 66. On the upwind side, which is plotted in full lines, the pressure coefficient without a spoiler is shown at 68 and the pressure coefficient with a spoiler is shown at 70.

It is demonstrated in FIG. 7a that the suction pressures on the downwind side of the forward part of the vertical fin surface would be considerably reduced and that other more minor effects would be experienced over other parts of the fin and rudder surfaces. The expected predominant effect would be that the integrated pressures over the forward part of the fin would be considerably reduced in comparison to those over the aft part of the fin and rudder surfaces. The weathercocking tendency of the fin can considerably be reduced without significantly affecting the directional control capability of the rudder by using the vertical fin stabilizer of the invention.

Data such as that presented in FIG. 7, but with the spoiler deflected, demonstrates that a 5% chord spoiler situated at a location at 110% of the vertical fin chord with a deflection $\delta_s$ of about 60° will produce a significant increase in the decrabing capability of the vertical fin stabilizer and rudder assembly if it occupies approximately the lower 50% of the vertical fin span, as shown in FIG. 8. A spoiler would be situated on each side of the vertical fin so that landings could be made with crosswinds from either direction.

Figure 9:
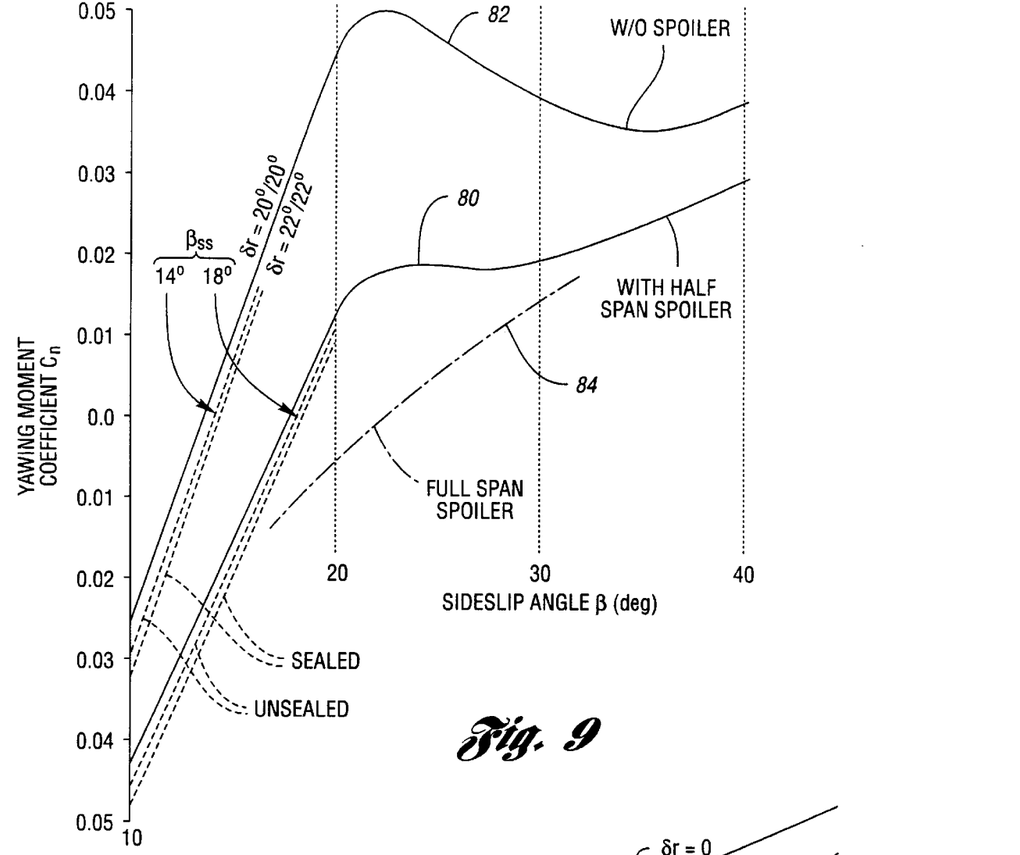
FIG. 9 is a plot of the yawing moment coefficient versus sideslip angle for a vertical fin stabilizer both with the spoiler of the present invention and with the spoiler.
Figure 9A:
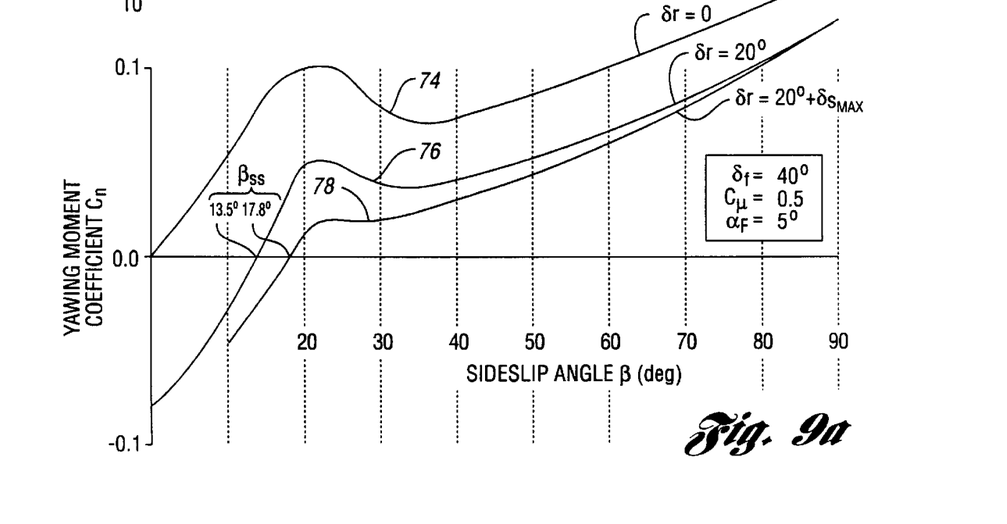
FIG. 9a is a plot of the yawing moment coefficient versus sideslip angle for a vertical fin stabilizer with various rudder angles.

The plot of FIG. 9a, which shows the total yawing moment coefficient on the ordinate for sideslip angles from 0 to 90°, demonstrates the effect of the spoiler shown in FIG. 8. The data in FIG. 9a assumes a flap angle of 40°, a coefficient of thrust of 0.5, and a fuselage angle of 5°. Rudder angles of 0° and 20° are plotted in FIG. 9a. The corresponding curve that is obtained when the vertical fin spoiler of the invention is used is shown at 78. The sideslip angle β is on the abscissa in FIG. 9a.

It is seen in FIG. 9a that the zero yawing moment intersection occurs at a steady state sideslip angle $\beta_{ss}$ for a 20° rudder angle at about 13.5°, and that for a 20° rudder angle with a fin spoiler fully deflected the estimated steady sideslip angle is 17.8°.

A negative slope of the plot of the yawing moment of coefficient versus sideslip angle occurs at S sideslip angles above 24°. This negative slope is an undesirable characteristic since it indicates reduced stability. The degree of the "negativeness" can be reduced, however, by increasing the spoiler span as shown in FIG. 9.

The data of FIG. 8 is repeated in FIG. 9. FIG. 9, however, shows the additional effect of an increased rudder travel to 22°/22°. With a rudder at that setting, the steady state slip capability (i.e., $\beta_{ss}$) can be increased from 14° to 18° by using the vertical fin spoiler of the invention.

The label "sealed" in FIG. 9 refers to a stabilizer fin and rudder assembly in which the hinge gap between the rudder and the trailing edge of the stabilizer fin is covered by a planar member that is contiguous with the stabilizer surface. An unsealed assembly would have an open hinge gap.

For purposes of comparison, an estimate of the sideslip angle for a full span spoiler is shown at 84. The data of FIG. 9a is used to plot the curves 80 and 82 in FIG. 9. These curves indicate the yawing moment of coefficient without a spoiler and with a half span spoiler, respectively.

It will be seen from the foregoing discussion that the invention increases sideslip capability. This feature should be considered in conjunction with other considerations such as the pilot's ability to control roll angle prior to touchdown and wing tip proximity to the ground. If these considerations are not taken into account, the ability of the pilot to fully decrab the aircraft during crosswind landings may be compromised even though sufficient sideslip capability exists for a 30 knot crosswind landing maneuver.

While an embodiment of the invention has been illustrated and described, it is not intended that the disclosure illustrates and describes all possible forms of the invention. It is intended that the following claims cover all modifications, alternative designs and all equivalents that fall within the spirit and scope of the invention.

What is claimed is:

1. A stabilizer fin and rudder assembly for an aircraft comprising:

a stabilizer fin with airfoil surfaces and with leading and trailing edges;

a rudder with a forward margin pivotally mounted on the stabilizer fin trailing edge;

the stabilizer fin and rudder assembly being subjected to Bernoulli forces as a relatively moving airstream passes over the assembly in a chordal direction;

the stabilizer fin being subjected to crosswind aerodynamic forces due to a crosswind in a direction transverse to the chordal direction; and a pair of fin spoiler means for establishing a lateral force unbalance on the stabilizer fin as the aircraft operates in a crosswind each fin spoiler means having a spoiler with an aerodynamic control surface, a forward margin of the control surface being pivoted on the stabilizer fin on a continuous pivot axis at a chordal location approximately at the stabilizer fin leading edge, one spoiler on each stabilizer fin airfoil surface, each spoiler being pivoted away from the stabilizer fin on the down crosswind side of the stabilizer fin;

the fin spoiler having a chordal width of less than 10% of the stabilizer fin and rudder assembly chord whereby effective sideslip capability for the stabilizer fin surfaces, when the aircraft is operated in a crosswind, is substantially increased.

2. A stabilizer fin and rudder assembly for an aircraft having enhanced de-crabbing capability during landing maneuvers in a crosswind, the assembly comprising:

a stabilizer fin with airfoil surfaces, the fin extending generally vertically and having a leading edge and a trailing edge;

a rudder with a forward margin pivotally mounted on the stabilizer fin trailing edge for motion about a generally vertical axis;

the stabilizer fin and rudder assembly being subjected to aerodynamic Bernoulli forces as a relatively moving airstream passes over the assembly in a chordal direction; and a pair of fin spoiler means for establishing a lateral force unbalance on the stabilizer fin as the aircraft operates in a crosswind each fin spoiler means having a spoiler with an aerodynamic control surface, a forward margin of the control surface being pivoted on the stabilizer fin on a continuous pivot axis at a chordal location approximately at the leading edge of the stabilizer fin airfoil surface, each spoiler being pivoted away from the stabilizer fin on the down crosswind side of the stabilizer fin;

each fin spoiler having a chordal length of approximately 2% to 10% of the chord of the stabilizer fin, whereby negative coefficients of pressure for down crosswind stabilizer fin surface locations forward of mid-chord during a landing maneuver in a crosswind are reduced relative to corresponding coefficients of pressure aft of mid-chord.

3. The stabilizer fin and rudder assembly set forth in claim 1 wherein each fin spoiler includes adjusting means for changing during deployment the angular position thereof relative to the stabilizer fin from an inactive position in which the fin spoiler control surface generally coincides with a stabilizer fin surface on the downwind side of the stabilizer fin to an active position wherein the fin spoiler is extended away from the stabilizer fin surface.

4. The stabilizer fin and rudder assembly set forth in claim 2 wherein each fin spoiler includes adjusting means for changing during deployment the angular position thereof relative to the stabilizer fin from an inactive position in which the fin spoiler control surface generally coincides with a stabilizer fin surface on the downwind side of the stabilizer fin to an active position wherein the fin spoiler is extended away from the stabilizer fin surface.

5. A stabilizer fin and rudder assembly for an aircraft comprising a stabilizer fin with leading and trailing edges for directional control of the aircraft and a rudder hinged at the trailing edge for yaw control thereof during maneuvers in a crosswind, the assembly comprising:

a fin spoiler on each side of the stabilizer fin at a location proximate to the leading edge, each of the fin spoilers having a leading edge hinged on a continuous pivot axis generally parallel to the leading edge of the stabilizer fin, the continuous pivot axis being approximately at the stabilizer fin leading edge; and means for adjusting a spoiler on the down crosswind side of the stabilizer fin from an inactive retracted position to an active extended position, whereby yaw control provided by the rudder is enhanced and sideslip capability is improved during landing maneuvers in a crosswind as negative pressure coefficients at locations forward of mid-chord on the downwind side of the stabilizer fin are reduced.

6. The stabilizer fin and rudder assembly set forth in claim 1 wherein the fin spoiler extends in the direction of the leading edge of the stabilizer fin from a base portion of the stabilizer fin to a generally mid-span location of the stabilizer fin.

7. The stabilizer fin and rudder assembly set forth in claim 2 wherein the fin spoiler extends in the direction of the leading edge of the stabilizer fin from a base portion of the stabilizer fin to a generally mid-span location of the stabilizer fin.

8. The stabilizer fin and rudder assembly set forth in claim 5 wherein the fin spoiler extends in the direction of the leading edge of the stabilizer fin from a base portion of the stabilizer fin to a generally mid-span location of the stabilizer fin.

* * * * *